(12) United States Patent
Deguchi et al.

(10) Patent No.: US 10,110,153 B2
(45) Date of Patent: Oct. 23, 2018

(54) CIRCUIT AND CONTROL METHOD FOR THE SAME

(71) Applicant: TOYOTA JIDOSHA KABUSHIKI KAISHA, Toyota-shi (JP)

(72) Inventors: Junichi Deguchi, Susono (JP); Makoto Funahashi, Gotemba (JP); Kensuke Yoshizue, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/673,517

(22) Filed: Aug. 10, 2017

(65) Prior Publication Data
US 2018/0062554 A1 Mar. 1, 2018

(30) Foreign Application Priority Data
Aug. 24, 2016 (JP) .................................. 2016-163986

(51) Int. Cl.
| | |
|---|---|
| *G01R 31/34* | (2006.01) |
| *H02K 3/28* | (2006.01) |
| *H02K 7/14* | (2006.01) |
| *H02P 25/083* | (2016.01) |
| *H02P 25/092* | (2016.01) |
| *H02P 6/08* | (2016.01) |

(52) U.S. Cl.
CPC ............ *H02P 25/083* (2013.01); *H02P 6/085* (2013.01); *H02P 25/092* (2016.02)

(58) Field of Classification Search
CPC ............. G01R 31/34; H02K 3/28; H02K 7/14

USPC ........................................................ 701/71
See application file for complete search history.

(56) References Cited

U.S. PATENT DOCUMENTS

2011/0043057 A1* 2/2011 Ota ........................ H02K 3/28
310/50

FOREIGN PATENT DOCUMENTS

JP 2013-240200 11/2013

OTHER PUBLICATIONS

Motoki Takeno et al. "Improvement of torque characteristic of a 50kW SRM for HEV with a consideration of magnetic saturation of stator yoke," The Japan Society of Applied Electromagnetics and Mechanics, vol. 19 No. 2, Jun. 2011 , 6 pages ( with English Abstract).

* cited by examiner

*Primary Examiner* — Bickey Dhakal
*Assistant Examiner* — Cortez Cook
(74) *Attorney, Agent, or Firm* — Oblon, McClelland, Maier & Neustadt, L.L.P.

(57) ABSTRACT

An electronic control unit switches a switching circuit such that a switched reluctance motor has a first winding pattern, when, with respect to a boundary dividing a driving range of the switched reluctance motor into two ranges, a torque and a rotational speed of the switched reluctance motor that are determined according to an applied voltage are located in the first range on the low load side. The electronic control unit switches the switching circuit such that the switched reluctance motor has a second winding pattern, when the torque and the rotational speed of the switched reluctance motor are located in a second range different from the first range.

7 Claims, 10 Drawing Sheets

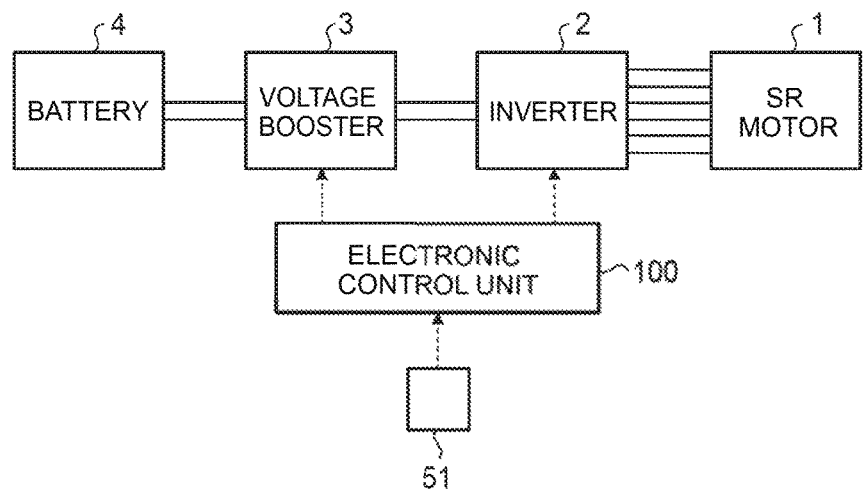
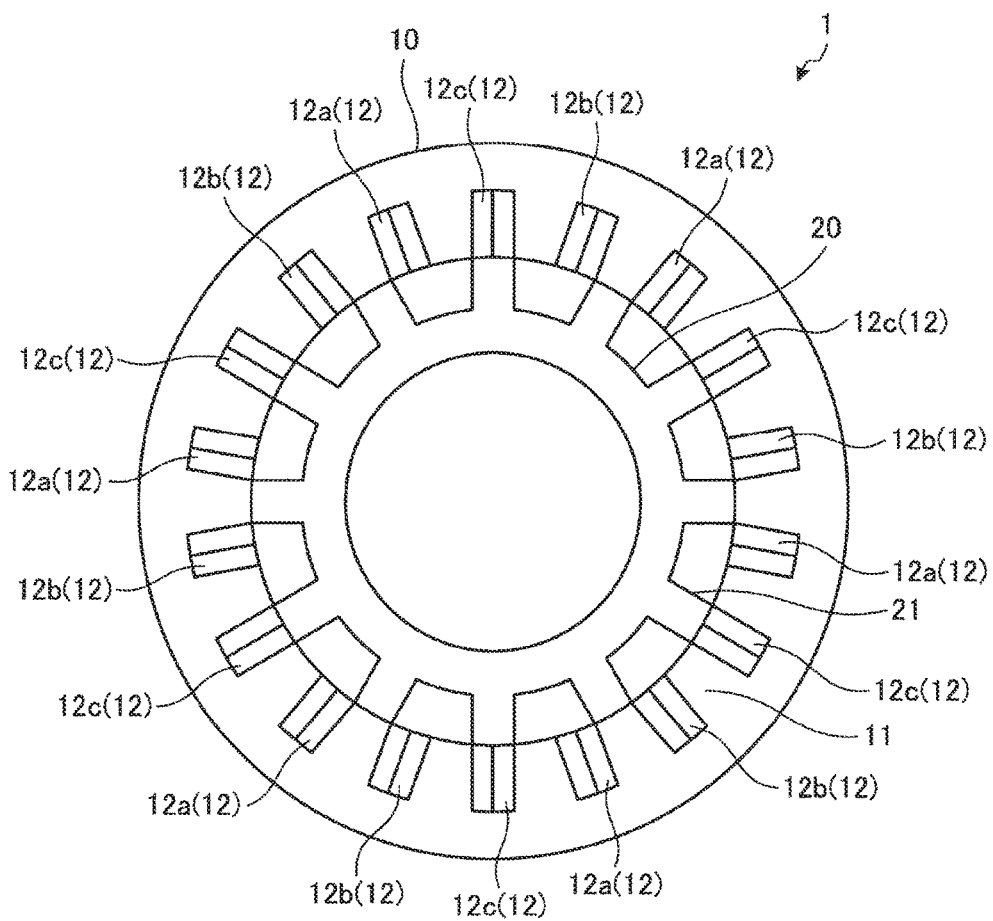

CIRCUIT AND CONTROL METHOD FOR THE SAME

INCORPORATION BY REFERENCE

The disclosure of Japanese Patent Application No. 2016-163986 filed on Aug. 24, 2016 including the specification, drawings and abstract is incorporated herein by reference in its entirety.

BACKGROUND

1. Technical Field

The disclosure relates to a circuit and a control method for the circuit.

2. Description of Related Art

There is known a switched reluctance motor including a stator having a plurality or salient poles, a rotor having a plurality of salient poles that are adapted to face the salient poles of the stator, and a plurality of coils respectively wound around the salient poles of the stator. The switched reluctance motor rotates the rotor by a magnetic attraction force generated between the salient poles of the stator and the rotor.

In Motoki Takeno and four others, "Improvement of torque characteristic of a 50 kW SRM for HEV with a consideration of magnetic saturation of stator yoke". The Japan Society of Applied Electromagnetics and Mechanics, Vol. 19, No. 2, June 2011, the results of comparison between torque characteristics of two winding patterns (NNNSSS winding and NSNSNS winding) are disclosed with respect to a switched reluctance motor like the one described above. This document disclose that since the NSNSNS winding is not easily magnetically saturated compared to the NNNSSS winding, the maximum torque of the NSNSNS winding becomes greater than that of the NNNSSS winding.

SUMMARY

In Motoki Takeno and four others, "Improvement of torque characteristic of a 50 kW SRM for HEV with a consideration of magnetic saturation of stator yoke". The Japan Society of Applied Electromagnetics and Mechanics, Vol. 19, No. 2, June 2011, it is suggested that the maximum torque of the switched reluctance motor is improved by employing the NSNSNS winding. However, the torque efficiency (hereinafter referred to simply as the "efficiency") of each of the NNNSSS winding and the NSNSNS winding varies according to a load state of the switched reluctance motor. Therefore, if the NSNSNS winding is employed only in consideration of improving the maximum torque, there is a possibility of causing degradation of efficiency.

The disclosure improves the maximum torque of a switched reluctance motor without degrading the efficiency of the switched reluctance motor.

A first aspect of the disclosure is a circuit. The circuit includes a switched reluctance motor, a switching circuit, and an electronic control unit. The switched reluctance motor is configured to be driven when excitation currents flow through three-phase coils. The switching circuit is connected to the switched reluctance motor. The switching circuit is configured to switch a first winding pattern and a second winding pattern. The first winding pattern is a winding pattern in which the three-phase coils are wound in the same direction. The second winding pattern is a winding pattern in which the two-phase coils of the three-phase coils are wound in the same direction, the remaining one-phase coil is wound in an opposite direction, and the two-phase coils with the same winding direction and the one-phase coil with the opposite winding direction are alternately arranged. The electronic control unit is configured to switch the switching circuit such that the switched reluctance motor has the first winding pattern, when the electronic control unit determines that a torque and a rotational speed of the switched reluctance motor are located in a first range on a lower load side than a boundary. The boundary divides a driving range of the switched reluctance motor into the first range and a second range. The electronic control unit is configured to switch the switching circuit such that the switched reluctance motor has the second winding pattern, when the electronic control unit determines that the torque and the rotational speed of the switched reluctance motor are located in the second range different from the first range. The driving range of the switched reluctance motor is a range that is determined by the torque and the rotational speed of the switched reluctance motor. The torque and the rotational speed of the switched reluctance motor are determined according to an applied voltage.

With the above-described configuration, by switching to the first winding pattern in a low load range and by switching to the second winding pattern in a range other than the low range, i.e. a high load range, it is possible to switch to the winding pattern, that is optimum in terms of efficiency, according to a load state of the switched reluctance motor.

In the above-described circuit, the second range when the voltage applied to the switched reluctance motor is low may be wider than the second range when the voltage applied to the switched reluctance motor is high.

With the above-described configuration, it is possible to switch to the optimum winding pattern while also taking into account that an efficient range in each of the winding patterns changes depending on voltage.

In the above-described circuit, the electronic control unit may be configured not to perform switching of the switching circuit when the electronic control unit determines that the torque and the rotational speed of the switched reluctance motor are located in a deadband. The deadband may be a range located at the boundary between the first range and the second range.

With the above-described configuration, by providing the deadband, switching loss due to frequent switching of the winding pattern can be suppressed, for example.

In the above-described circuit, the switching circuit may include switching circuits for a plurality of phases.

With the above-described configuration, since the plurality of switching circuits take charge of switching operations, the load of an inverter due to frequent switching of the winding pattern can be distributed, for example.

In the above-described circuit, an excitation width of the first winding pattern may be greater than an excitation width of the second winding pattern.

With the above-described configuration, by setting the excitation width of the first winding pattern, in which rising of current is slower than in the second winding pattern, to be greater than the excitation width of the second winding pattern, it is possible to prevent torque shortage when the winding pattern is switched to the first winding pattern.

In the above-described circuit, the electronic control unit may be configured to advance a phase of an excitation start angle of the first winding pattern than a phase of an excitation start angle of the second winding pattern.

With the above-described configuration, the excitation period of the first winding pattern can be set greater than that of the second winding pattern.

A second aspect of the disclosure is a control method for a circuit. The circuit includes a switched reluctance motor, a switching circuit, and an electronic control unit. The switched reluctance motor is configured to be driven when excitation currents flow through three-phase coils. The switching circuit is connected to the switched reluctance motor. The switching circuit is configured to switch a first winding pattern and a second winding pattern. The first winding pattern is a winding pattern in which the three-phase coils are wound in the same direction. The second winding pattern is a winding pattern in which the two-phase coils of the three-phase coils are wound in the same direction, the remaining one-phase coil is wound in an opposite direction, and the two-phase coils with the same winding direction and the one-phase coil with the opposite winding direction are alternately arranged. The control method includes: switching, by the electronic control unit, the switching circuit such that the switched reluctance motor has the first winding pattern, when the electronic control unit determines that a torque and a rotational speed of the switched reluctance motor are located in a first range on a lower load side than a boundary, and switching, by the electronic control unit, the switching circuit such that the switched reluctance motor has the second winding pattern, when the electronic control unit determines that the torque and the rotational speed of the switched reluctance motor are located in a second range different from the first range. The boundary divides a driving range of the switched reluctance motor (1) into the first range and the second range. The driving range of the switched reluctance motor is a range that is determined by the torque and the rotational speed of the switched reluctance motor. The torque and the rotational speed of the switched reluctance motor are determined according to an applied voltage.

With the above-described configuration, it is possible to improve the maximum torque of the switched reluctance motor without degrading the efficiency of the switched reluctance motor by switching to the first winding pattern in a low load range and switching to the second winding pattern in a range other than the low load range, i.e. a high load range.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a diagram schematically showing a system configuration including a control device of a switched reluctance motor according to an embodiment of the disclosure;

FIG. 2 is a diagram schematically showing the configuration of the switched reluctance motor in the control device of the switched reluctance motor according to the embodiment of the disclosure;

DETAILED DESCRIPTION OF EMBODIMENTS

Figure 3:
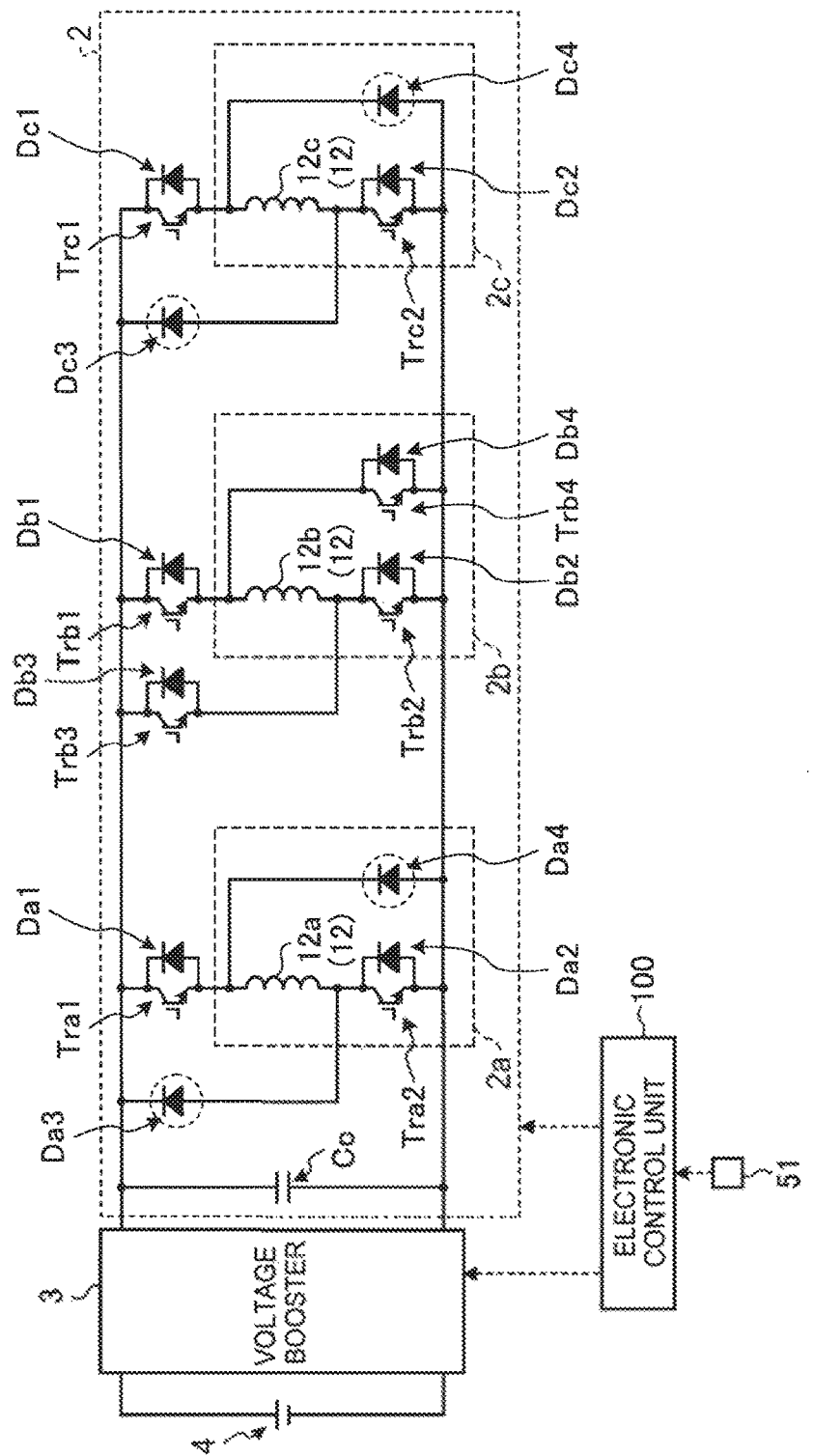
FIG. 3 is a diagram schematically showing the configuration of an inverter circuit in the control device of the switched reluctance motor according to the embodiment of the disclosure.

A control device of a switched reluctance motor according to an embodiment of the disclosure will be described with reference to the drawings. The disclosure is not limited to the embodiment described below. Further, components in the following embodiment may be replaced with components that are apparent for those skilled in the art or that are substantially the same as those in the following embodiment.

As shown in FIG. 1, the system configuration of this embodiment includes a switched reluctance motor (hereinafter referred to as an "SR motor") 1, an inverter 2, a voltage booster 3, a battery 4, and an electronic control unit 100. A control device of the SR motor 1 according to this embodiment includes at least the inverter 2 and the electronic control unit 100.

As shown in FIG. 1, the SR motor 1 is electrically connected to the battery 4 via the inverter 2 and the voltage booster 3. The SR motor 1 and the inverter 2 are electrically connected to each other via coils 12 (see FIG. 2). The SR motor 1 functions as not only an electric motor, but also an electric generator.

The SR motor 1 is an electric motor that does not use a permanent magnet in a rotor, and is driven by the flow of excitation currents through the three-phase coils 12. As shown in FIG. 2, the SR motor 1 includes a stator 10 of a salient-pole structure and a rotor 20 of a salient-pole structure. In FIG. 2, as the SR motor 1, a three-phase induction motor including an 18-pole stator 10 and a 12-pole rotor is shown by way of example.

The SR motor 1 of the three-phase alternating-current type has a phase A (phase U) formed of a pair of stator teeth 11 and corresponding coils 12a, a phase B (phase V) formed of a pair of stator teeth 11 and corresponding coils 12b, and a phase C (phase W) formed of a pair of stator teeth 11 and corresponding coils 12c.

As shown in FIG. 2, the stator 10 includes the plurality of stator teeth 11 as salient poles in its annular inner peripheral portion. The coils 12 connected to the inverter 2 are respectively wound around the stator teeth 11.

The rotor 20 is disposed radially inward of the stator 10 and includes a plurality of rotor teeth 21 as salient poles in its annular outer peripheral portion. The rotor 20 is configured to rotate together with a rotor shaft (not shown).

As shown in FIG. 3, the inverter 2 is constituted by an electric circuit (inverter circuit) including a plurality of switching elements for supplying three-phase currents to the coils 12. The inverter 2 supplies a current per phase to the coils 12 connected to the inverter circuit.

The inverter circuit constituting the inverter 2 includes two transistors and four diodes, provided per phase, and one capacitor Co. For each phase, the inverter 2 simultaneously turns on or off the two transistors to change a current value that flows through the coils 12.

For the phase A, the inverter 2 includes transistors Tra1 and Tra2 and diodes Da1, Da2, Da3, and Da4. For the phase B, the inverter 2 includes transistors Trb1 and Trb2, diodes Db1, Db2, Db3, and Db4. For the phase C, the inverter 2 includes transistors Trc1, Trc2 Trc3, and Trc4 and diodes Dc1, Dc2, Dc3, and Dc4. A portion 2a, a portion 2b, and a portion 2c in FIG. 3 respectively show portions of circuits forming the phase A, the phase B, and the phase C. The portions 2a, 2b, and 2c will be described later.

The voltage booster 3 is provided between the inverter 2 and the battery 4 and boots a voltage that is applied to the SR motor 1. The voltage booster 3 is constituted by, for example, a boost converter.

The electronic control unit 100 controls the driving of the SR motor 1. The electronic control unit 100 includes a CPU, a storage section storing data such as various programs, and a control section that performs various calculations for controlling the driving of the SR motor 1. As a result of the calculations in the control section, a command signal for controlling the inverter 2 is output to the inverter 2 from the electronic control unit 100. In this way, by controlling the inverter 2, the electronic control unit 100 controls the voltage and excitation current that are applied to the SR motor 1. As will be described later, the electronic control unit 100 switches a winding pattern of the SR motor 1 by controlling the inverter 2 (see FIGS. 4 to 5).

A resolver signal is input to the electronic control unit 100 from a rotational speed sensor 51 that detects the rotational speed of the SR motor 1. Based on a relative positional relationship between the stator teeth 11 and the rotor teeth 21 in a rotational direction of the SR motor 1 calculated from the resolver signal, the electronic control unit 100 performs control of repeatedly switching the coils 12 to be energized from one phase to another. In this control, the electronic control unit 100 supplies an excitation current to the coils 12 of a certain phase to excite the corresponding stator teeth 11 so as to generate a magnetic attraction force between the excited stator teeth 11 and the rotor teeth 21 located near the excited stator teeth 11, thereby rotating the rotor 20.

Figure 4:
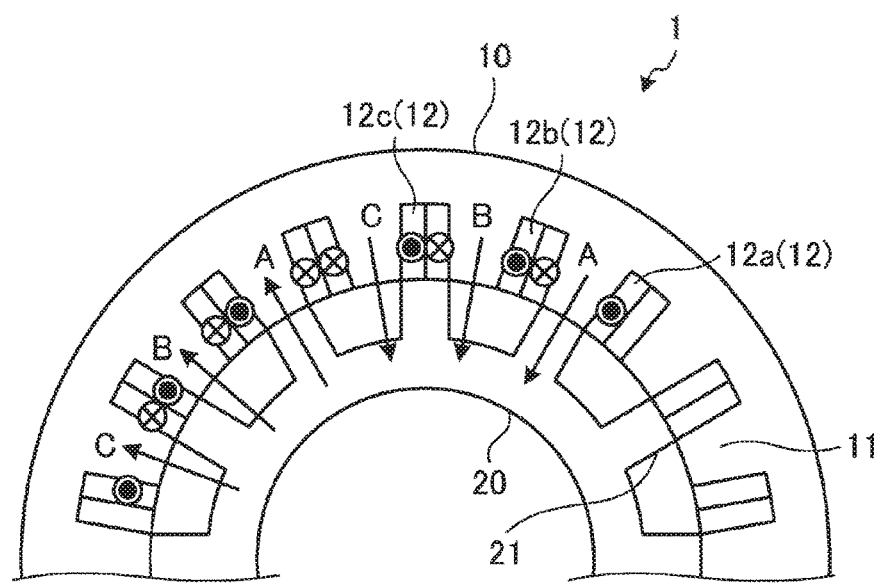
FIG 4 is a diagram showing the magnetic poles when the winding pattern is switched to NNNSSS winding in the control device of the switched reluctance motor according to the embodiment of the disclosure.

As shown in the portion 2b of FIG. 3, the inverter 2 includes a switching circuit that can switch the winding pattern (magnetic pole arrangement pattern) of the SR motor 1 between NNNSSS winding (first winding pattern) and NSNSNS winding (second winding pattern) according to a connection mode with the SR motor 1. In this switching circuit, for example, the magnetic poles of the adjacent phases A, B, and C are the same as each other as shown in FIG 4. That is, in FIG. 4, the phases are arranged from the right in the order of phase A, phase B, phase C, phase A, phase B, and phase C, and the magnetic poles thereof are in the order of N-pole, N-pole, N-pole, S-pole, S-pole, and S-pole.

The winding pattern in which the three-phase coils 12a, 12b, and 12c are wound in the same direction as described above is called "NNNSSS winding".

Figure 5:
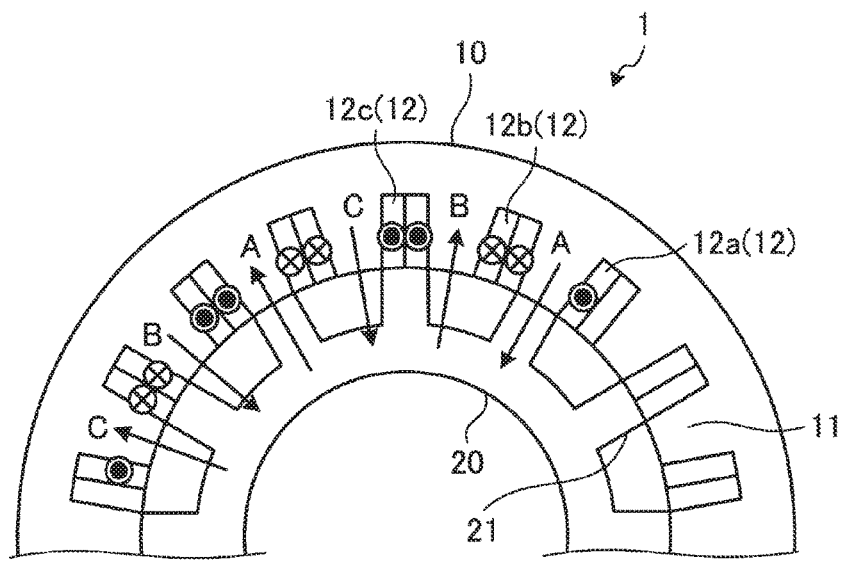
FIG. 5 is a diagram showing the magnetic poles when the winding pattern is switched to NSNSNS winding in the control device of the switched reluctance motor according to the embodiment of the disclosure.

On the other hand, in the switching circuit shown in the portion 2b of FIG. 3, for example, only a direction of the magnetic pole of the phase B is opposite to a direction of the magnetic poles of the adjacent phases A and C in the magnetic poles of the adjacent phases A, B, and C as shown in FIG. 5. That is, in FIG. 5, the phases are arranged from the right in the order of phase A, phase B, phase C, phase A, phase B, and phase C, and the magnetic poles thereof are in the order of N-pole, S-pole, N-pole, S-pole, N-pole, and S-pole.

The winding pattern in which, as described above, two (herein the coils 12a and 12c) of the three-phase coils 12a, 12b, and 12c are wound in the same direction with the remaining one (herein the coil 12b) wound in the opposite direction, and further, the two coils 12a and 12c with the same winding direction and the one coil 12b with the opposite winding direction are alternately arranged is called "NSNSNS winding". Note that "the two coils 12a and 12c with the same winding direction and the one coil 12b with the opposite winding direction are alternately arranged" specifically represents a state where the coil 12b is arranged between the coil 12a and the coil 12c in a circumferential direction of the stator 10 as shown in FIG. 5.

In the control device of the SR motor 1 according to this embodiment, the two winding patterns are switched therebetween during the driving of the SR motor 1. On the other hand, as described before, the efficiency of each of the NNNSSS winding and the NSNSNS winding varies according to a load state of the SR motor 1.

Figure 6:
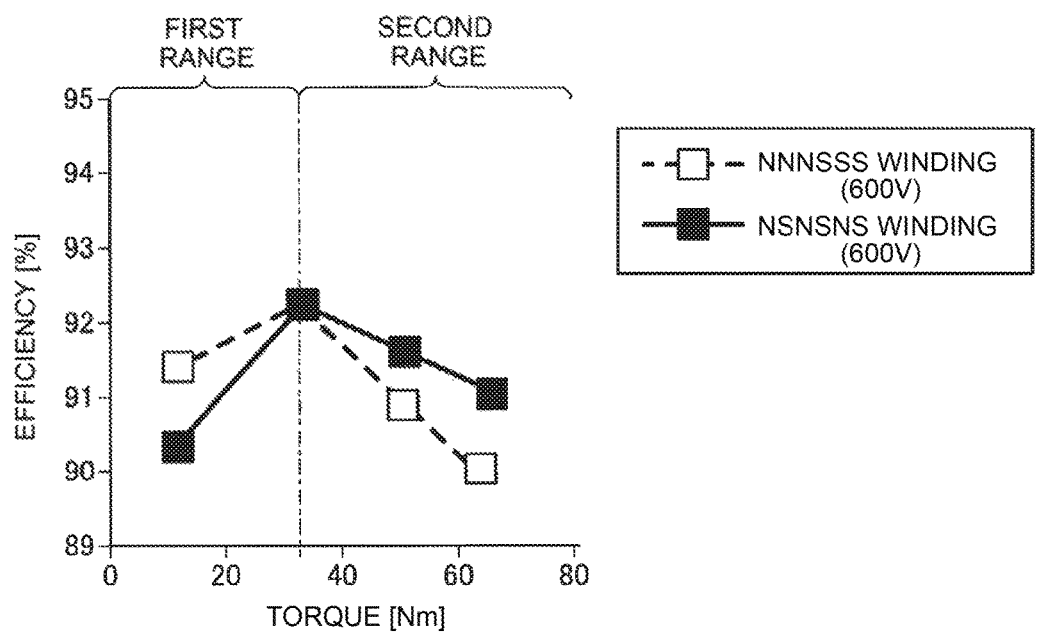
FIG. 6 is a graph showing a relationship between the torque and the efficiency in each winding pattern.

FIG. 6 shows a relationship between the load (torque) and the efficiency in each of the winding patterns (NNNSSS winding and NSNSNS winding) when a voltage of 600V is applied to the SR motor 1. As shown in FIG. 6, in a first range being a range on the low load (low torque) side, the efficiency of the NNNSSS winding is relatively higher than that of the NSNSNS winding. On the other hand, in a second range being a range on the high load (high torque) side, the efficiency of the NSNSNS winding is relatively higher than that of the NNNSSS winding.

Figure 7:
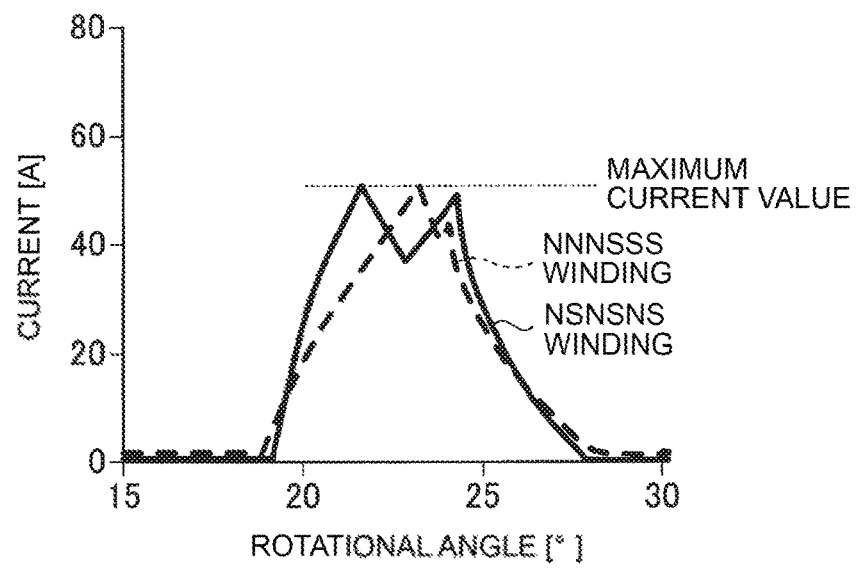
FIG. 7 is a graph showing a current waveform in each winding pattern.
Figure 8:
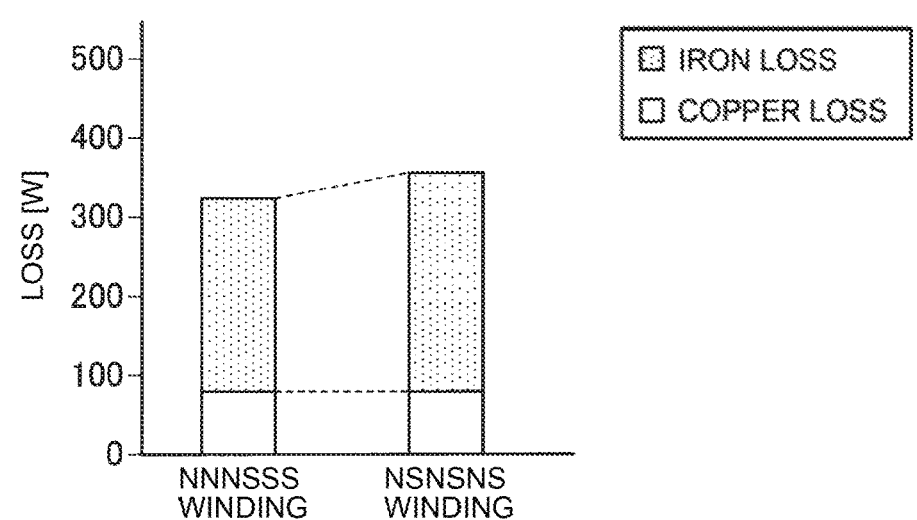
FIG. 8 is a graph showing iron loss and copper loss in each winding pattern.

FIG. 7 shows a current waveform in each of the winding patterns (NNNSSS winding and NSNSNS winding). The reason why the efficiency of the NSNSNS winding is reduced at low load as described above is considered that since, as shown in FIG. 7, the timing (rotational angle) at which current rises to a predetermined maximum current value is earlier in the NSNSNS winding (see a solid line) than in the NNNSSS winding (see a broken line), the number of switching times is increased, and as shown in FIG. 8, iron loss is increased in the NSNSNS winding compared to that in the NNNSSS winding. Note that, as shown in FIG. 8, copper loss is the same in the NNNSSS winding and the NSNSNS winding. Herein, "maximum current value" described above is an element included in excitation conditions of the SR motor 1 (see FIG. 12 which will be described later). Further, "the number of switching times" described above is the number of current increasing and decreasing times in an excitation period (specifically a hysteresis period) of the coil 12.

Based on the knowledge described above, so the control device of the SR motor 1 according to this embodiment, the winding pattern is switched to either of the NNNSSS winding and the NSNSNS winding according to a load state of the SR motor 1 during the driving of the SR motor 1. Specifically, the winding pattern is switched to the NNNSSS winding in the low load (low torque) range like the first range in FIG. 6, while the winding pattern is switched to the NSNSNS winding in the high load (high torque) range like the second range in FIG. 6. This makes it possible to switch the winding pattern to the optimum winding pattern according to an efficient range in each of the NNNSSS winding and the NSNSNS winding.

Figure 9:
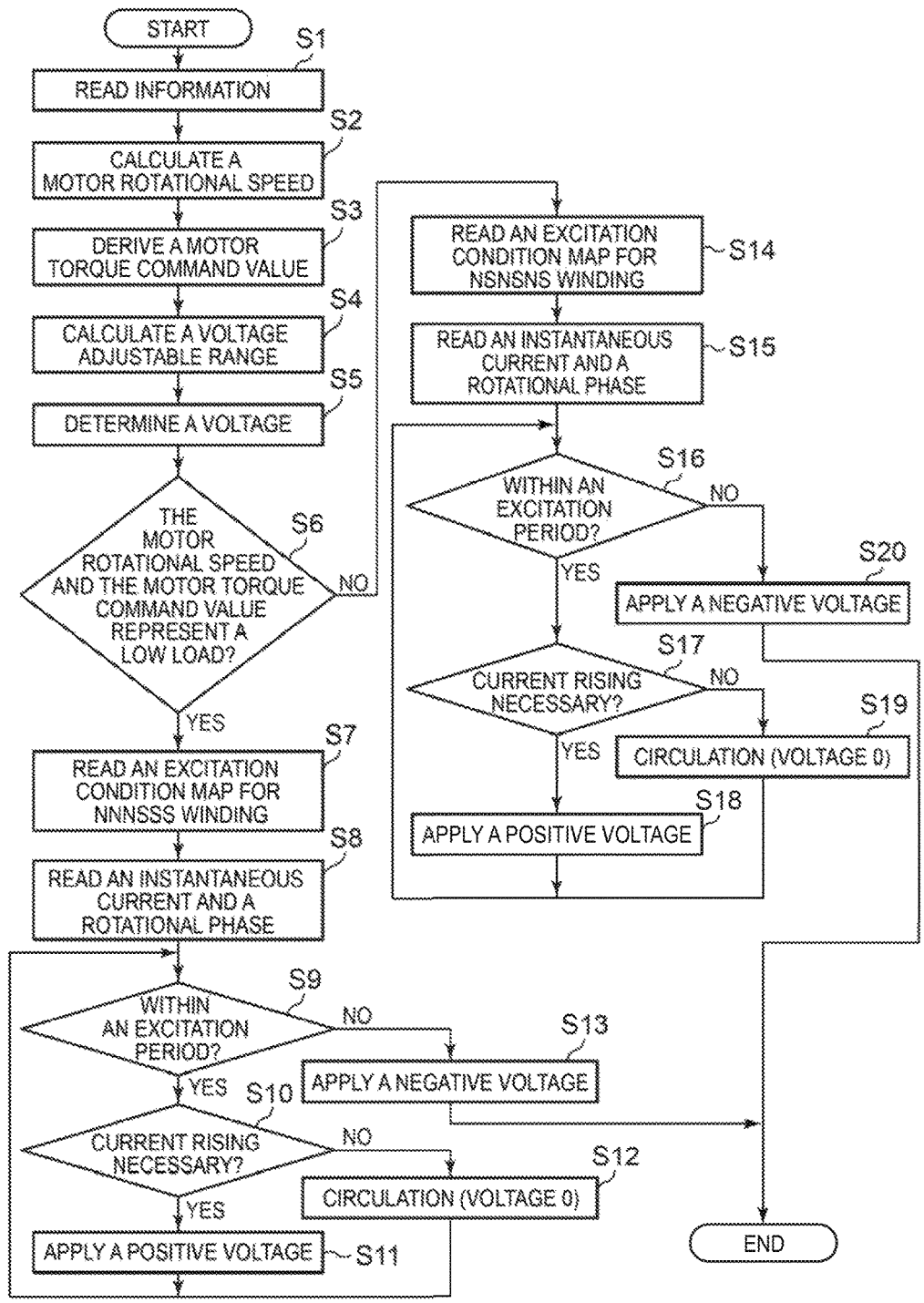
FIG. 9 is a flowchart showing one example of a driving control method by the control device of the switched reluctance motor according to the embodiment of the disclosure.

Hereinbelow, one example of a driving control method by the electronic control unit 100 for the SR motor 1 according to this embodiment will be described with reference to FIG. 9.

First, the electronic control unit 100 reads various information for use in controlling the driving of the SR motor 1 (step S1). Note that "various information" described above are specifically a resolver signal that is input from the rotational speed sensor 51, and a required torque of the SR motor 1.

Then, the electronic control unit 100 calculates a rotational speed of the SR motor 1 (hereinafter referred to as a "motor rotational speed") based on the resolver signal of the rotational speed sensor 51 (step S2). Then, the electronic control unit 100 derives a motor torque command value corresponding to the required torque (step S3). Then, the electronic control unit 100 calculates a voltage adjustable range based on a vehicle state and so on (step S4). Note that "voltage adjustable range" described above represents a range of voltage that is applied to the SR motor 1. Then, the electronic control unit 100 determines a voltage, that is applied to the SR motor 1, based on the vehicle state and so on (step S5).

Then, the electronic control unit 100 determines whether or not the motor rotational speed and the motor torque command value represent a low load (step S6). At this step, specifically, the determination process is performed by referring to a switching map shown in FIG. 10.

Figure 10:
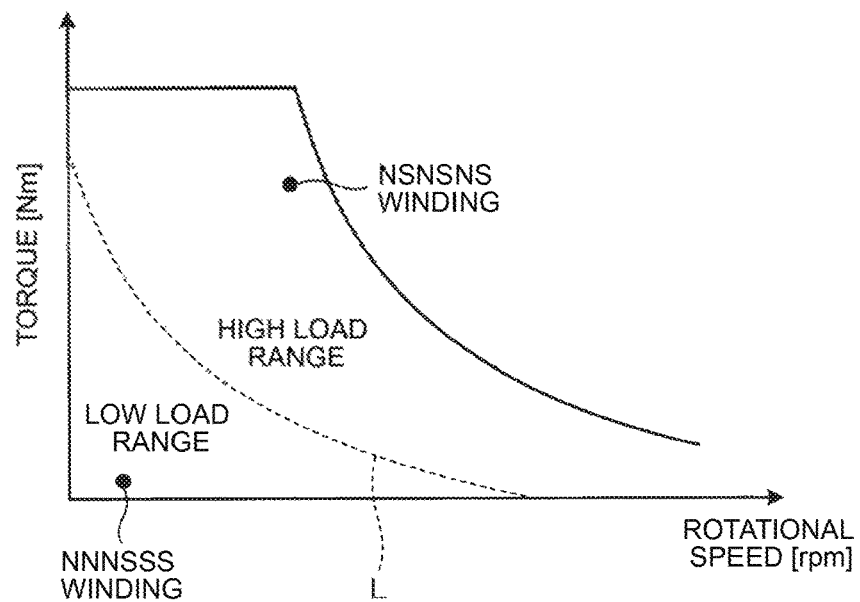
FIG. 10 is a graph showing the characteristics of the switched reluctance motor when a high voltage (600V) is applied to the switched reluctance motor in the control device of the switched reluctance motor according to the embodiment of the disclosure.

Specifically, the switching map shown in FIG. 10 defines a driving range of the SR motor 1 that is determined by the torque and rotational speed of the SR motor 1. In the switching map of FIG. 10, the driving range of the SR motor 1 is divided into two ranges, i.e. a low load range (first range) and a high load range (second range), with a predetermined switching line L as a boundary therebetween.

The low load range is a range where the torque and rotational speed are relatively low, and more specifically, is a range where the torque and rotational speed are lower than the switching line L in the driving range of the SR motor 1. The high load range is a range where the torque and rotational speed are relatively high, and more specifically, is a range where the torque and rotational speed are higher than the switching line L in the driving range of the SR motor 1. As shown in FIG. 10, the switching line L is formed by a curved line such that the higher the torque, the lower the rotational speed and that the lower the torque, the higher the rotational speed. The switching line L may be formed by, for example, a straight line such that the higher the torque, the lower the rotational speed and that the lower the torque, the higher the rotational speed.

At this step, a different switching map is used depending on the voltage determined at step S5. For example, when the voltage determined at step S5 is a high voltage (e.g. 600V), the switching map (switching map for high voltage) shown in FIG. 10 is used. On the other hand, when the voltage determined at step S5 is a low voltage (e.g. 300V), a switching map (switching map for low voltage) shown in FIG. 11 is used.

Figure 11:
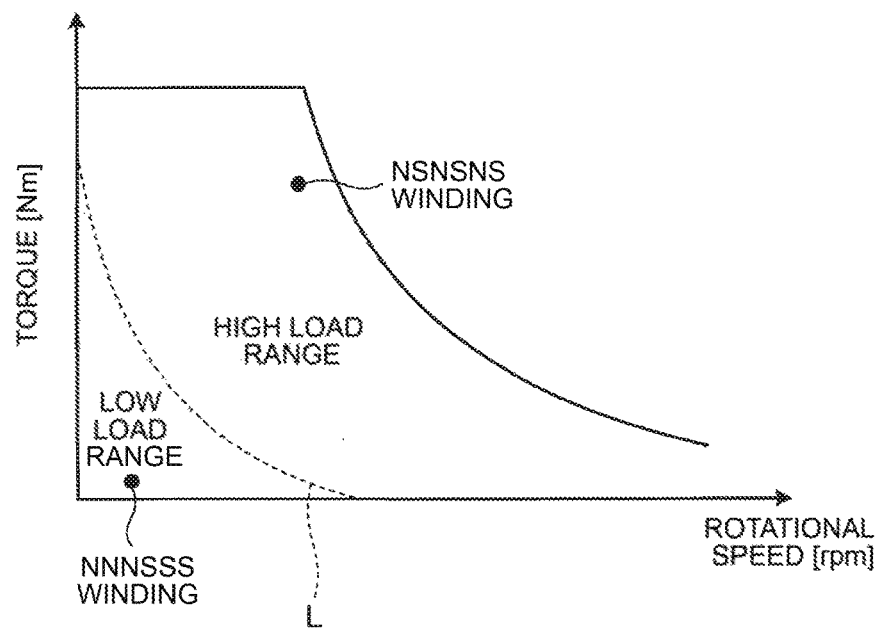
FIG. 11 is a graph showing the characteristics of the switched reluctance motor when a low voltage (300V) is applied to the switched reluctance motor in the control device of the switched reluctance motor according to the embodiment of the disclosure.

As shown in FIG. 11, a high load range of the low-voltage switching map is wider than the high load range of the high-voltage switching map (see FIG. 10), while a low load range of the low-voltage switching map is narrower than the low load range of the high-voltage switching map (see FIG. 10).

The low-voltage switching map shown in FIG. 11 is configured such that the ratio of the high load range to the low load range in the driving range is large compared to the high-voltage switching map (see FIG. 10). That is, as the voltage that is applied to the SR motor 1 is set lower, the electronic control unit 100 uses a switching map with a greater ratio of a high load range to a low load range in a driving range at this step. This makes it possible to switch the winding pattern to the optimum winding pattern while also taking into account that an efficient range in each of the NNNSSS winding and the NSNSNS winding changes depending on voltage.

At step S6, the electronic control unit 100 determines whether or not an operating point determined by the motor rotational speed and the motor torque command value is located in the low load range of the switching map. That is, the electronic control unit 100 determines whether the motor rotational speed and the motor torque command value, determined according to the applied voltage, are located on the low load range side or on the high load range side, different from the low load range, with respect to the boundary (the switching line L of the switching map) dividing the driving range of the SR motor 1 into the two ranges.

When the electronic control unit 100 has determined that the operating point of the SR motor 1 is located in the low load range of the switching map (Yes at step S6), the electronic control unit 100 connects the switching circuit such that the winding pattern of the SR motor 1 becomes the NNNSSS winding, and reads an excitation condition map for the NNNSSS winding (step S7).

Figure 12:
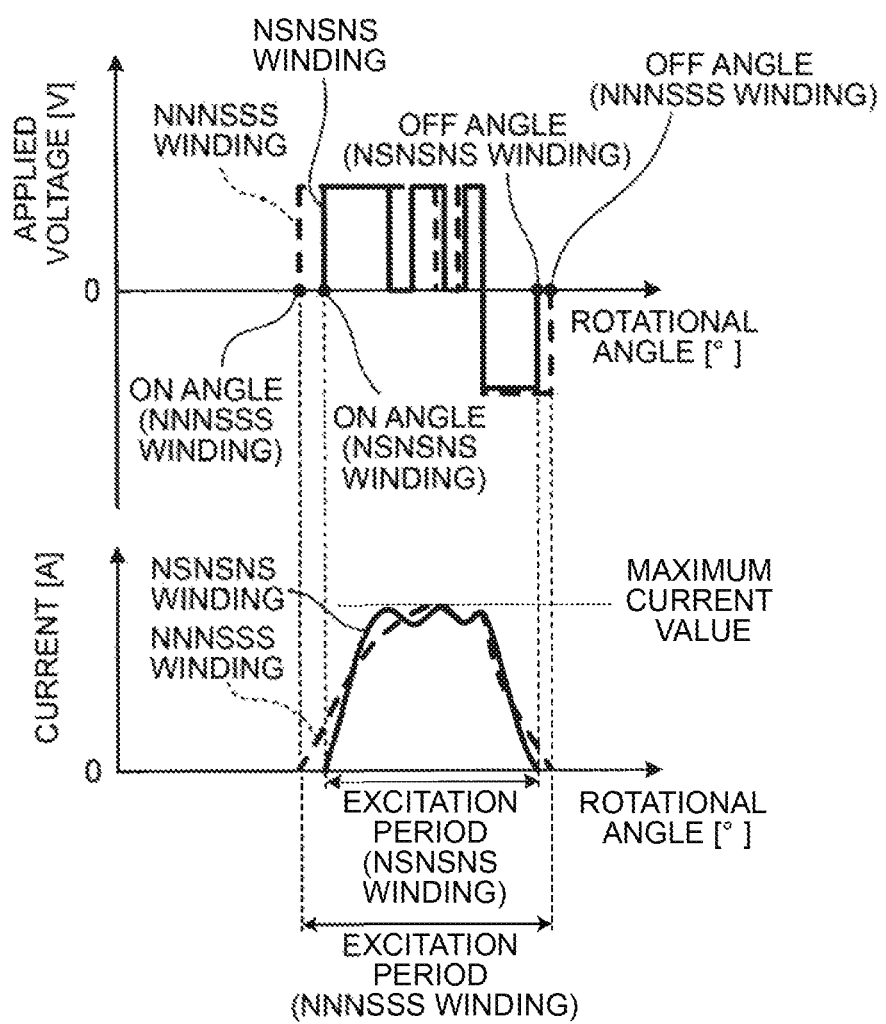
FIG. 12 is a graph showing excitation conditions and a current waveform for each winding pattern in the control device of the switched reluctance motor according to the embodiment of the disclosure.

At this step, as shown in FIG. 4, the electronic control unit 100 switches the magnetic poles of the SR motor 1 to the NNNSSS winding. Then, the electronic control unit 100 reads the excitation condition map in which an ON angle (excitation start angle), an OFF angle (excitation end angle), a maximum current value, and so on are described as shown in FIG. 12. In FIG. 12, for convenience of description, the excitation condition of both the NNNSSS winding and the NSNSNS winding are shown on the same map. However, actually, only the excitation conditions of the NNNSSS winding are described in an excitation condition map for the NNNSSS winding, while only the excitation conditions of the NSNSNS winding are described in an excitation condition map for the NSNSNS winding.

As shown in FIG. 12, the excitation conditions differ between the NNNSSS winding and the NSNSNS winding. That is, as shown in FIG. 12, the electronic control unit 100 controls such that an excitation period (excitation width) of the NNNSSS winding becomes greater than an excitation period (excitation width) of the NSNSNS winding. Herein, since rising of current is slower in the NNNSSS winding than in the NSNSNS winding as shown in FIG. 12, if the excitation period of the NNNSSS winding is equal to that of the NSNSNS winding, there is a possibility of shortage of torque. Therefore, as described above, by setting the excitation width of the NNNSSS winding, in which rising of current is slower than in the NSNSNS winding, to be greater than the excitation width of the NSNSNS winding, it is possible to prevent torque shortage when the winding pattern is switched to the NNNSSS winding.

In order to set the excitation period of the NNNSSS winding to be greater than that of the NSNSNS winding as described above, the phase of an excitation start angle (ON angle) of the NNNSSS winding is advanced than (made to precede) that of an excitation start angle (ON angle) of the NSNSNS winding as shown in FIG. 12.

Then, the electronic control nit 100 reads an instantaneous current flowing through the coil 12 for each phase and a rotational phase (rotational angle) of the rotor 20 (step S8). At this step, the electronic control unit 100 reads an instantaneous current actually flowing through the coil 12 of a certain phase based on a detection signal from a current sensor (not shown). Further, the electronic control unit 100 detects a rotational phase of the rotor 20 based on the resolver signal of the rotational speed sensor 51.

Then, the electronic control unit 100 determines whether or not it is within an excitation period, based on the rotational phase of the rotor 20 (step S9). Herein, "excitation period" described above represents a rotational angle range (excitation width) from an ON angle (excitation start angle) to an OFF angle (excitation end angle) as shown in FIG. 12. When the electronic control unit 100 has determined that it is within the excitation period (Yes at step S9), the electronic control unit 100 determines whether or not current rising is necessary, based on the excitation condition map (see FIG. 12) (step S10).

When the electronic control unit 100 has determined that the current rising is necessary (Yes at step S10), the electronic control nit 100 performs a "positive voltage mode" of applying a positive voltage to the coil 12 (step S11) and returns to the process of step S9. On the other hand, when the electronic control unit 100 has determined that the current rising it not necessary (No at step S10), the electronic control unit 100 performs a "circulation mode" of making zero a voltage that is applied to the coil 12 (step S12), and returns to the process of step S9. When the electronic control unit 100 has determined at step S9 that it is not within the excitation period (No at step S9), the electronic control unit 100 performs a "negative voltage mode" of applying a negative voltage to the coil 12 (step S13) and ends this routine.

When the electronic control unit 100 has determined at step S6 that the operating point of the SR motor 1 is not in the low load range of the switching map (No at step S6), the electronic control unit 100 connects the switching circuit such that the winding pattern of the SR motor 1 becomes the NSNSNS winding, and reads an excitation condition map for the NSNSNS winding (step S14).

At this step, as shown in FIG. 5, the electronic control unit 100 switches the magnetic poles of the SR motor 1 to the NSNSNS winding. Then, the electronic control unit 100 reads the excitation condition map in which an ON angle (excitation start angle), an OFF angle (excitation end angle), a maximum current value, and so on are described as shown in FIG. 12.

Then, the electronic control unit 100 reads an instantaneous current flowing through the coil 12 for each phase and a rotational phase (rotational angle) or the rotor 20 (step S15). The content of this step is the same as that of step S8.

Then, the electronic control unit 100 determines whether or not it is within an excitation period, based on the rotational phase of the rotor 20 (step S16). When the electronic control unit 100 has determined that it is within the excitation period (Yes at step S16), the electronic control unit 100 determines whether or not current rising is necessary, based on the excitation condition map (see FIG. 12) (step S17).

When the electronic control unit 100 has determined that the current rising is necessary (Yes at step S17), the electronic control unit 100 performs a "positive voltage mode" of applying a positive voltage to the coil 12 (step S18) and returns to the process of step S16. On the other hand, when the electronic control unit 100 has determined that the current rising is not necessary (No at step S17), the electronic control unit 100 performs a "circulation mode" of making zero a voltage that is applied to the coil 12 (step S19), and returns to the process of step S16. When the electronic control unit 100 has determined at step S16 that it is not within the excitation period (No at step S16), the electronic control unit 100 performs a "negative voltage mode" of applying a negative voltage to the coil 12 (step S20) and ends this routine.

As described above, by providing the switching circuit shown in the portion 2b of FIG. 3, the electronic control unit 100 for the SR motor 1 according to this embodiment can switch the winding pattern of the coils 12 during the driving of the SR motor 1. That is, conventionally, either of the winding patterns, i.e. the NNNSSS winding and the NSNSNS winding, is uniquely determined by the hardware configuration of an inverter, and thus it is impossible to change the winding pattern during the driving of the SR motor 1. On the other hand, in the case of the electronic control unit 100 for the SR motor 1 according to this embodiment, it is possible to switch to the winding pattern, that is optimum in terms of efficiency, according to a load state of the SR motor 1.

Further, the electronic control unit 100 for the SR motor 1 according to this embodiment can improve the maximum torque of the SR motor 1 without degrading the efficiency of the SR motor 1 by switching to the NNNSSS winding in the low load range and switching to the NSNSNS winding in the high load range.

Figure 13:
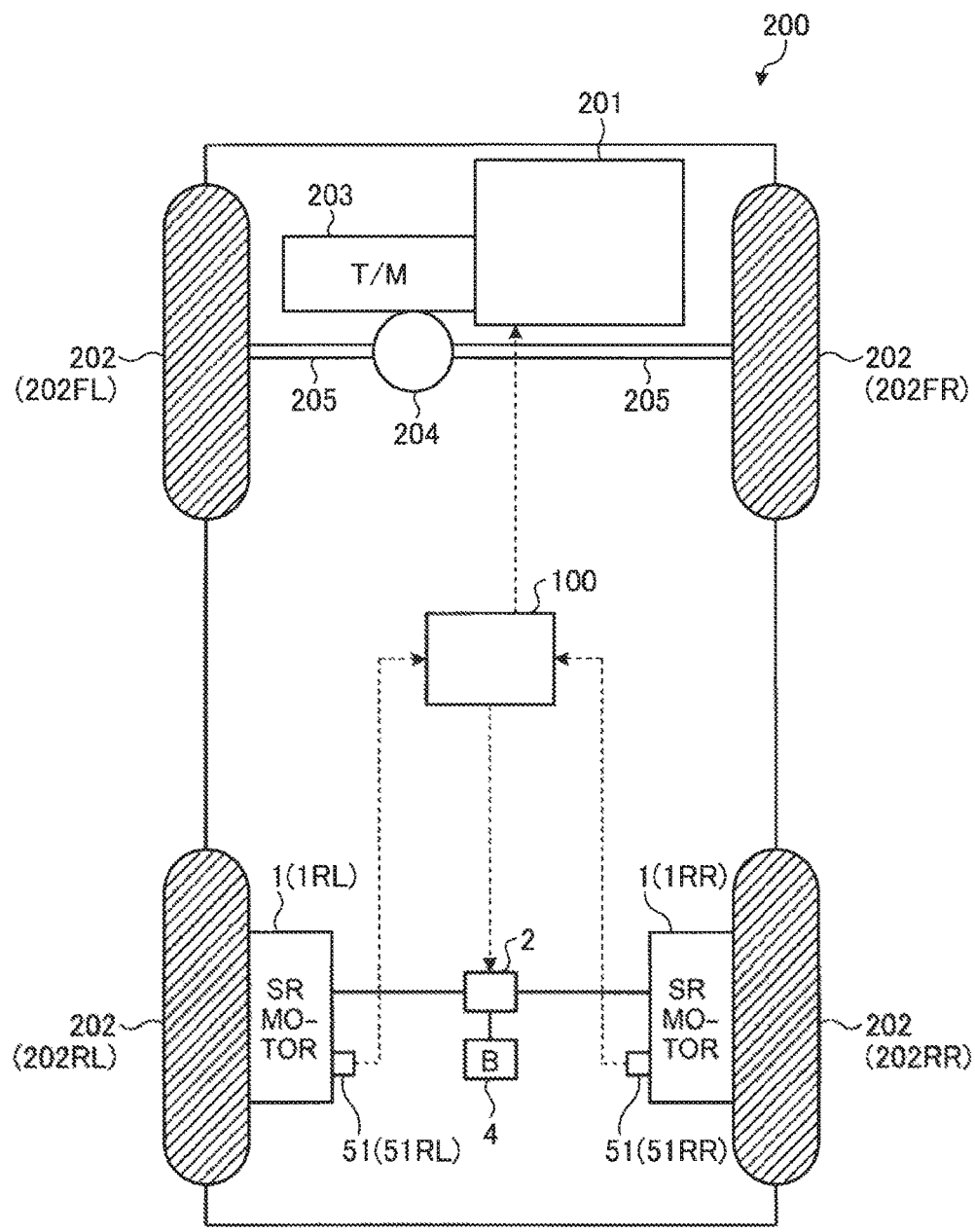
FIG. 13 is a skeleton diagram showing a vehicle to which the control device of the switched reluctance motor according to the embodiment of the disclosure is applied.

Hereinbelow, a vehicle to which the electronic control unit 100 for the SR motor 1 according to this embodiment is applied will be described with reference to FIG. 13. A vehicle 200 shown in FIG. 13 includes an engine 201, wheels 202, a transmission (T/M) 203, a differential gear 204, drive shafts 205, and SR motors (SRMs) 1. The vehicle 200 is a four-wheel drive vehicle in which the engine 201 drives the left and right front wheels 202FL and 202FR, while the SR motor 1 as rear motors respectively drive the left and right rear wheels 202RL and 202RR.

The SR motor 1 is a so-called in-wheel motor and is provided for each of the left and right rear wheels 202RL and 202RR. In a rear drive unit of the vehicle 200, the left rear SR motor 1RL is connected to the left rear wheel 202RL, and the right rear SR motor 1RR is connected to the right rear wheel 202RR. The rear wheels 202RL and 202RR are rotatable independently of each other.

The left rear wheel 202RL is driven by the output torque (motor torque) of the left rear SR motor 1RL. The right rear wheel 202RR is driven by the output torque (motor torque) of the right rear SR motor 1RR.

The left rear SR motor 1RL and the right rear SR motor 1RR are connected to a battery (B) 4 via an inverter 2. The left rear SR motor 1RL and the right rear SR motor 1RR each function as an electric motor by electric power supplied from the battery 4, and also as an electric generator that converts torque (external force) transmitted from the rear wheel 202RL, 202RR into electric power. The inverter 2 includes an electric circuit for the left rear SR motor 1RL and an electric circuit for the right rear SR motor 1RR.

An electronic control unit 100 controls the left rear SR motor 1RL, the right rear SR motor 1RR, and the engine 201. For example, the electronic control unit 100 includes an SR-motor electronic control unit (SR-motor ECU) and an engine electronic control unit (engine ECU). In this case, the engine ECU performs engine torque control to adjust an output torque of the engine 201 to a target torque value by intake control, fuel injection control, ignition control, and so on. The SR-motor ECU performs motor control for the left rear SR motor 1RL and the right rear SR motor 1RR based on signals input from a rotation speed sensor 51. The rotational speed sensor 51 includes a left rear rotational speed sensor 51RL that detects a rotational speed of the left rear SR motor 1RL, and a right rear rotational speed sensor 51RR that detects a rotational speed of the right rear SR motor 1RR.

While the control device of the switched reluctance motor according to the disclosure has been described in detail with reference to the mode for carrying out the disclosure, the spirit of the disclosure is not limited to those descriptions and should be broadly interpreted based on the description in SUMMARY. Further, it goes without saying that various changes, modifications, and so on that are made based on those descriptions are included in the spirit of the disclosure.

For example, in the control device of the SR motor 1 according to this embodiment, a voltage step-down portion (step-down converter) for reducing a voltage that is applied to the SR motor 1 may be provided instead of the voltage booster 3 (see FIG. 1).

Figure 14:
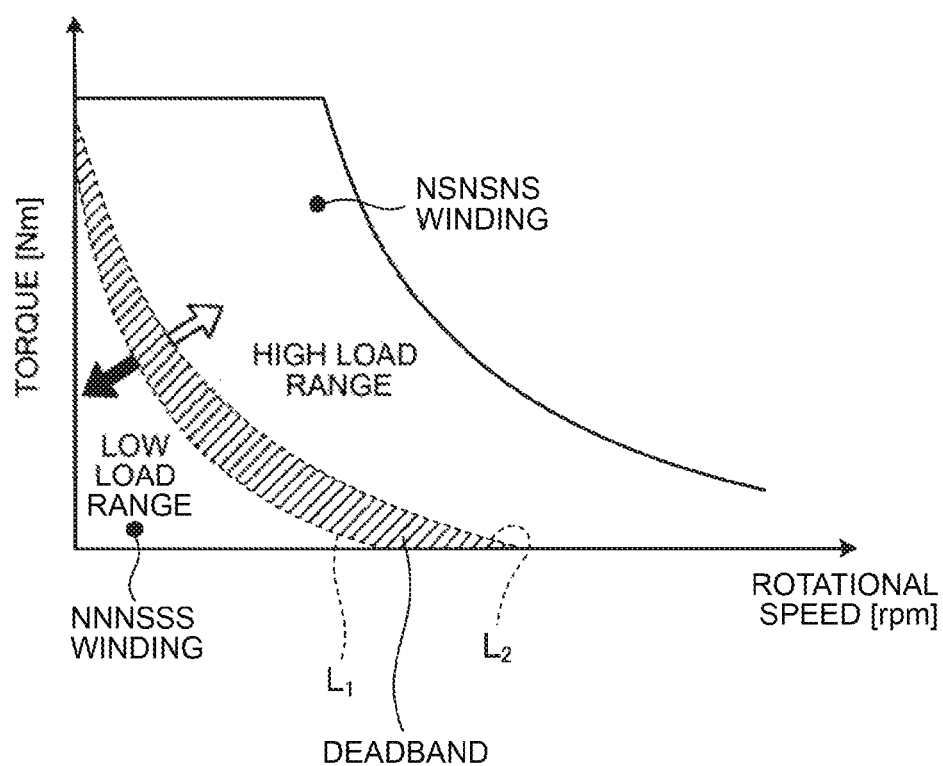
FIG. 14 is a graph showing the characteristics of each winding pattern in the control device of the switched reluctance motor according to the embodiment of the disclosure, wherein a deadband is provided at the boundary between a low load range and a high load range.

In the control device of the SR motor 1 according to this embodiment, when determining whether or not the motor rotational speed and the motor torque command value represent a low load (see step S6 in FIG. 9), use may be made of, for example, as shown in FIG. 14, a switching map in which a deadband where switching of the winding pattern is not performed is provided at the boundary between a low load range and a high load range. In this case, as shown in FIG. 14, at the boundary between the low load range and the high load range, a first switching line $L_1$ is provided on the low load range side, a second switching line $L_2$ is provided on the high load range side, and a deadband is provided between the first switching line $L_1$ and the second switching line $L_2$. When the operating point of the SR motor 1 is located in the deadband, the electronic control unit 100 does not perform switching between the NNNSSS winding and the NSNSNS winding.

In the control device of the SR motor 1 according to this embodiment, by providing the deadband, switching loss due to frequent switching of the winding pattern can be suppressed, for example.

In the control device of the SR motor 1 according to this embodiment, as shown in FIG. 3, if the inverter 2 includes a switching circuit for at least one phase, switching between the NNNSSS winding and the NSNSNS winding is made possible, but the inverter 2 may include switching circuits for a plurality of phases. In this case, in FIG. 3, transistors may be respectively added to diodes Da3 and Da4 in the phase A and diodes Dc3 and Dc4 in the phase C, each encircled by a broken line.

Consequently, in the control device of the SR motor 1 according to this embodiment, since the plurality of switching circuits take charge of switching operations, the load of the inverter 2 due to frequent switching of the winding pattern can be distributed, for example.

An application example of the electronic control unit 100 for the SR motor 1 according to the embodiment is not limited to the one shown in FIG. 13 (hereinafter referred to as "Application Example 1"). For example, an application example of the electronic control unit 100 for the SR motor 1 may be a configuration in which, differently from Application Example 1, the SR motors 1 are provided for all the wheels 202 (Application Example 2). Alternatively, differently from Application Example 1, it may be a rear-wheel drive vehicle provided with no front drive unit (Application Example 3).

An application example of the electronic control unit 100 for the SR motor 1 may be a configuration in which, differently from Application Examples 1 to 3, a travel power source of the vehicle 200 is only the SR motor 1 as an in-wheel motor (Application Example 4). Alternatively, differently from Application Example 4, it may be a configuration in which the SR motor 1 is not an in-wheel motor (Application Example 5).

An application example of the electronic control unit 100 for the SR motor 1 may be a configuration in which, differently from Application Example 5, the configuration of Application Example 1 is mounted as a front drive unit (Application Example 6). Alternatively, it may be a configuration in which, differently from Application Example 3, no rear drive unit is provided, or in which, differently from Application Example 4, the arrangement of a drive unit is longitudinally reversed (Application Example 7).

What is claimed is:
1. A circuit comprising:
a switched reluctance motor configured to be driven when excitation currents flow through three-phase coils;
a switching circuit connected to the switched reluctance motor, the switching circuit configured to switch a first winding pattern and a second winding pattern,
the first winding pattern being a winding pattern in which the three-phase coils are wound in the same direction,
the second winding pattern being a winding pattern in which the two-phase coils of the three-phase coils are wound in the same direction, the remaining one-phase coil is wound in an opposite direction, and the two-phase coils with the same winding direction and the one-phase coil with the opposite winding direction are alternatively arranged; and
an electronic control unit configured to switch the switching circuit such that the switched reluctance motor has the first volume pattern, when the electronic control unit determines that a torque and a rotational speed of the switched reluctance motor are located in a first range on a lower load side than a boundary,
the boundary dividing a driving range of the switched reluctance motor into the first range and a second range,
the electronic control unit configured to switch the switching circuit such that the switched reluctance motor has the second winding pattern, when the electronic control unit determines that the torque and the rotational speed of the switched reluctance motor are located in the second range different from the first range, the driving range of the switched reluctance motor being a range that is determined by the torque and the rotational speed of the switched reluctance motor, and the torque and the rotational speed of the switched reluctance motor being determined according to an applied voltage.

2. The circuit according to claim 1, wherein the second range when the voltage applied to the switched reluctance motor is low is wider than the second range when the voltage applied to the switched reluctance motor is high.

3. The circuit according to claim 1, wherein the electronic control unit is configured not to perform switching of the switching circuit when the electronic control unit determines that the torque and the rotational speed of the switched reluctance motor are located in a deadband, and the deadband is a range located at the boundary between the first range and the second range.

4. The circuit according to claim 1, wherein the switching circuit includes switching circuits for a plurality of phases.

5. The circuit according to claim 1, wherein an excitation width of the first winding pattern is greater than an excitation width of the second winding pattern.

6. The circuit according to claim 5, wherein the electronic control unit is configured to advance a phase of an excitation start angle of the first winding pattern than a phase of an excitation start angle of the second winding pattern.

7. A control method for a circuit,
the circuit including a switched reluctance motor, a switching circuit, and an electronic control unit,
the switched reluctance motor configured to be driven when excitation currents flow through three-phase coils;
the switching circuit connected to the switched reluctance motor, the switching circuit configured to switch a first winding pattern and a second winding pattern,
the first winding pattern being a winding pattern in which the three-phase coils are wound in the same direction,
the second winding pattern being a winding pattern in which the two-phase coils of the three-phase coils are wound in the same direction, the remaining one-phase coil is wound in an opposite direction, and the two-phase coils with the same winding direction and the one-phase coil with the opposite winding direction are alternately arranged,
the control method comprising:
switching, by the electronic control unit, the switching circuit such that the switched reluctance motor has the first winding pattern, when the electronic control unit determines that a torque and a rotational speed of the switched reluctance motor are located in a first range on a lower load side than a boundary, and
switching, by the electronic control unit, the switching circuit such that the switched reluctance motor has the second winding pattern, when the electronic control unit determines that the torque and the rotational speed of the switched reluctance motor are located in a second range different from the first range,
the boundary dividing a driving range of the switched reluctance motor into the first range and the second range, the driving range of the switched reluctance motor being a range that is determined by the torque and the rotational speed of the switched reluctance motor, and the torque and the rotational speed of the switched reluctance motor being determined according to an applied voltage.

* * * * *